(12) United States Patent
Weitkamp et al.

(10) Patent No.: US 7,067,448 B1
(45) Date of Patent: Jun. 27, 2006

(54) METHOD FOR PRODUCTION OF N-ALKANES FROM MINERAL OIL FRACTIONS AND CATALYST FOR CARRYING OUT SAID METHOD

(75) Inventors: Jens Weitkamp, Horb am Neckar (DE); Hilmar Bischof, Marl (DE); Werner Doehler, Gelsenkirchen (DE); Juergen Laege, Haltern (DE); Franz Fuder, Bottrop (DE); Andreas Raichle, Esslingen (DE); Yvonne Traa, Stuttgart (DE)

(73) Assignee: Veba Oil Refining and Petrochemicals GmbH (DE)

(*) Notice: Subject to any disclaimer, the term of this patent is extended or adjusted under 35 U.S.C. 154(b) by 501 days.

(21) Appl. No.: 10/110,717

(22) PCT Filed: Oct. 4, 2000

(86) PCT No.: PCT/EP00/09698

§ 371 (c)(1),
(2), (4) Date: Aug. 21, 2002

(87) PCT Pub. No.: WO01/27223

PCT Pub. Date: Apr. 19, 2001

(30) Foreign Application Priority Data

Oct. 13, 1999 (DE) .................... 199 49 211

(51) Int. Cl.
*B01J 29/04* (2006.01)
*B01J 29/87* (2006.01)
*C07C 13/465* (2006.01)
*C01B 33/36* (2006.01)
*C10G 45/00* (2006.01)

(52) U.S. Cl. .............. 502/60; 502/74; 502/77; 585/266; 585/310; 585/275; 585/276; 585/277; 585/700; 423/700; 423/DIG. 22; 208/57; 208/111.01

(58) Field of Classification Search ........... 502/60, 502/74, 77; 585/266, 310, 275–277, 700; 423/700, DIG. 22; 208/57, 111.01
See application file for complete search history.

(56) References Cited

U.S. PATENT DOCUMENTS

| | | | |
|---|---|---|---|
| 3,256,356 A * | 6/1966 | Jame, Jr. .................... 585/484 |
| 3,702,886 A | 11/1972 | Argauer et al. ............. 423/705 |
| 3,720,728 A * | 3/1973 | Pollitzer ..................... 585/266 |
| 3,843,510 A | 10/1974 | Morrison et al. ....... 208/111.15 |
| 4,100,218 A * | 7/1978 | Chen et al. ................. 585/310 |
| 4,166,077 A * | 8/1979 | Bernard et al. ............. 585/310 |
| 4,469,909 A * | 9/1984 | Chester et al. ............. 585/481 |
| 4,482,773 A * | 11/1984 | Chu et al. ................... 585/481 |
| 4,686,316 A * | 8/1987 | Morrison .................... 585/708 |
| 4,861,932 A | 8/1989 | Chen et al. ................. 585/412 |
| 5,026,673 A * | 6/1991 | Gates et al. ................. 502/62 |
| 5,174,981 A * | 12/1992 | Hellring et al. ............ 423/705 |
| 5,240,892 A * | 8/1993 | Klocke ........................ 502/77 |
| 5,498,810 A * | 3/1996 | Bogdan et al. ............. 585/310 |

(Continued)

FOREIGN PATENT DOCUMENTS

EP        0 512 652        11/1992

(Continued)

*Primary Examiner*—J. A. Lorengo
*Assistant Examiner*—Patricia L. Hailey
(74) *Attorney, Agent, or Firm*—Mary Jo Kanady

(57) ABSTRACT

The invention relates to a method for the production of n-alkanes from mineral oil fractions and fractions from thermal or catalytic conversion plants, containing cyclic alkanes, alkenes, cyclic alkenes and/or aromatics. The invention further relates to a catalyst for carrying out said method.

21 Claims, 2 Drawing Sheets

U.S. PATENT DOCUMENTS

Figure 1:
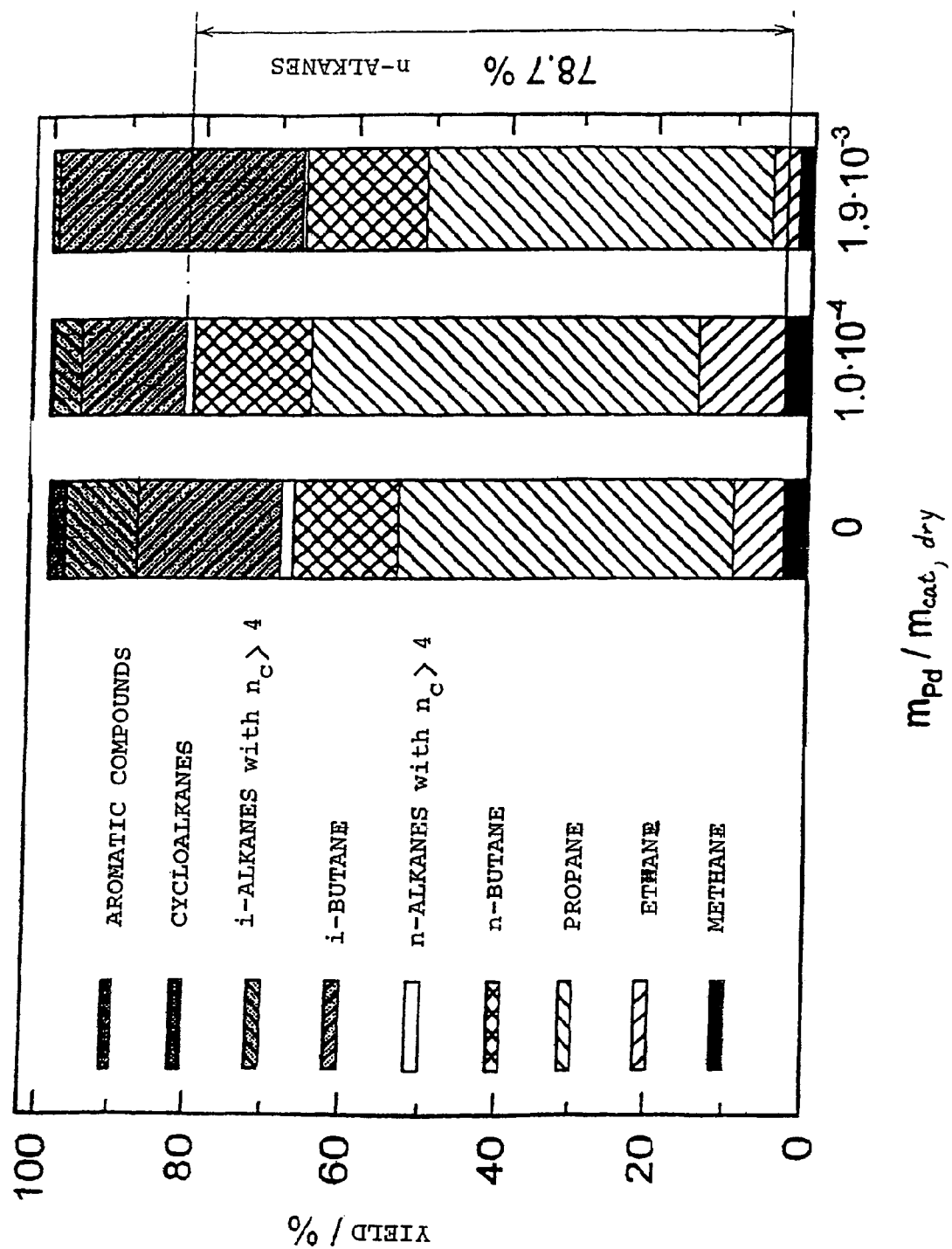

| | | | |
|---|---|---|---|
| 5,529,964 A * | 6/1996 | Weitkamp et al. | 502/74 |
| 5,545,784 A * | 8/1996 | Weitkamp et al. | 585/250 |
| 5,865,986 A * | 2/1999 | Buchanan et al. | 208/65 |
| 6,103,215 A * | 8/2000 | Zones et al. | 423/702 |
| 6,160,191 A * | 12/2000 | Smith et al. | 585/475 |
| 6,203,694 B1 * | 3/2001 | Love et al. | 208/135 |
| 6,346,498 B1 * | 2/2002 | Chang et al. | 502/64 |
| 6,541,408 B1 * | 4/2003 | Chang et al. | 502/64 |
| 6,797,849 B1 * | 9/2004 | McMinn et al. | 585/319 |
| 2004/0192539 A1 * | 9/2004 | Juttu et al. | 502/60 |

FOREIGN PATENT DOCUMENTS

| | | |
|---|---|---|
| EP | 0 885 655 | 12/1998 |
| GB | 1 259 384 | 1/1972 |
| GB | 1 400 454 | 7/1975 |
| WO | 95 28459 | 10/1995 |

\* cited by examiner

METHOD FOR PRODUCTION OF N-ALKANES FROM MINERAL OIL FRACTIONS AND CATALYST FOR CARRYING OUT SAID METHOD

The subject matter of the invention is a process for the manufacture of n-alkanes from mineral oil fractions and fractions from thermal or catalytic conversion plants containing cyclic alkanes, alkenes, cyclic alkenes and/or aromatic compounds as well as a new catalyst for performing the process.

In the past few years the specifications for mineral oils and fuels have been changed to the effect that, for example, lead-containing admixtures are no longer permissible as anti-knock compounds. This makes it necessary for the manufacturers of motor fuels to make available modified processes which result in higher octane numbers and a sufficient knock resistance of the fuel. On account of the changes in the processes, today fuels having a somewhat higher content of aromatic compounds are manufactured, so that the present fuels generally have contents of aromatic compounds of up to 60% by volume or more, depending on the type (e.g. normal/super). In Germany the maximum benzene content that is permissible at present is 5% by volume.

It is intended in future to fix limiting values for concentrations of aromatic compounds in fuels. As a result the emissions of aromatic compounds and radical-forming compounds are to be reduced. Fuels which satisfy these specifications have to have a reduced steam pressure, a lower final boiling point and reduced contents of olefins, benzol and other aromatic compounds. Such fuels are to have a content of aromatic compounds of 35% by vol. or less.

These specifications can only be attained if large amounts of the aromatic compounds are exchanged for equivalent aliphatic compounds or boosters e.g. methyl tert. butyl ether (MTBE). In accordance with the previous prior art it is expensive and dear to produce fuels rich in aliphatic compounds. The content of aromatic compounds in the fuel was previously the means of the choice in order to be able to achieve the necessary octane numbers without adding lead. Therefore in future there will be a considerable booster consumption for the manufacture of fuel. However, the permanent purchase of boosters also signifies a significant economic disadvantage for the fuel manufacturer.

On account of the reduction in the content of aromatic compounds in fuels, fractions rich in aromatic compounds have to be supplied for a new use. The main process in Europe for the production of ethylene and propylene is the thermal cracking of naphtha in olefin plants. During this process a pyrolysis (heavy) petrol rich in olefins and aromatic compounds inter alia is produced. In the past this was admixed as a high-octane constituent to the motor fuel. With the introduction of the new fuel specifications the content of aromatic compounds in the motor fuel is to be limited, so that ways were sought to supply the pyrolysis (heavy) petrol for another use with high value creation.

Various processes for the manufacture of non-cyclic and iso-alkanes from mineral oil fractions which contain cyclic alkanes andd aromatic compounds are known from the prior art.

Thus U.S. Pat. No. 5,831,139 describes a process for the manufacture of aliphatic fuels with lower concentrations of aromatic compounds and a lower boiling point. In the process the high-boiling naphtha content is converted into isobutane and other isoparaffin derivatives and the content of cyclic compounds is considerably reduced. For the manufacture of these fuel constituents the naphtha fraction is firstly subjected to a hydrogenation via a hydrogenation catalyst in order to convert the aromatic compounds obtained thus into cyclic alkane compounds. For this hydrogenation a normal hydrogenation catalyst is used, which preferably contains metal percentages from the platinum group such as, for example, platinum, palladium, ruthenium, rhodium, osmium and iridium. These metals are situated on an inorganic oxide carrier which preferably consists of aluminium oxide.

After the hydrogenation the selective iso-paraffin synthesis is performed in a second reaction stage. For this an isoparaffin synthesis catalyst is used, which may, for example, consist of a zeolite of the type MOR, FAU, LTL, MAZ, MEL, MFI, MTW and Beta. In this case the zeolites MOR, FAU, MAZ and Beta are preferred. Such zeolite types are known from the prior art and are described in the following patent specifications (U.S. Pat. No. 4,083,886 and U.S. Pat. No. 4,826,801 [MOR], U.S. Pat. No. 3,130,007 and U.S. Pat. No. 4,401,556 [FAU], U.S. Pat. No. 3,216,789 and U.S. Pat. No. 4,503,023 [LTL], U.S. Pat. No. 4,241,036 and U.S. Pat. No. 5,192,727 [MAZ], U.S. Pat. No. 3,709,979 [MEL], U.S. Pat. No. 3,702,886 [MFI] and U.S. Pat. No. 3,832,449 [MTW], U.S. Pat. No. 3,308,069/Re 28 341 and U.S. Pat. No. 5,095,169 [Beta]).

The easily volatilised products of isoparaffin synthesis are separated, and the not easily volatilised content is supplied to a ring opening stage. For the ring opening a non-acid catalyst is used, which consists of Pt, Pd, Ru, Rh, Os, Ir or mixtures thereof on an inorganic oxide and/or a zeolite, but preferably 0.9% by weight Pt and 0.8 K on theta-aluminium oxide. Non-acid, wide-pore, i.e. not shape-selective zeolites, preferably zeolite L, are used as zeolites. The products of the ring opening are again supplied for selective isoparaffin synthesis.

By the process aliphatic benzine constituents are manufactured by ring opening and isoparaffin synthesis, whereby highly branched iso-alkanes are to be produced as far as possible, without reducing the carbon number in comparison with the charged hydrocarbon. The octane number of the product is to be as high as possible. Methyl cyclopentane, which can more easily be subjected to ring opening reactions than alkanes with six ring structure, is preferably used as the initial hydrocarbon.

WO 97/09288 A1 also describes a ring opening process for naphthene, whereby a fraction is brought into contact with a metal-containing catalyst which contains iridium or ruthenium or mixtures thereof. The fraction contains 20% by weight n-butyl cyclohexane in pentane and is converted to a substance mixture consisting of at least 10% $C_{10}$ paraffins with a selectivity of at least 0.2, the selectivity being defined as % content $C_{10}$ paraffin yield to % content with $C_{10}$ ring opening. The process is performed at temperatures of 150 to 400° C. in the presence of hydrogen and a total pressure of 0 to 3000 psig.

The catalyst used preferably contains iridium, ruthenium and rhodium as metal constituents. Zeolites which possess a faujasite structure with only a few acid centres and are not shape-selective are used as catalysts. If ECR-32 is used as zeolite, the metal addition is preferably 0.9% by weight iridium.

High-grade diesel or aviation turbine fuels are to be produced with the process by ring narrowing from the six ring to the five ring with subsequent ring opening at the metal. With this process too, no reduction of the carbon number takes place in comparison the charging hydrocarbon. The manufacture of higher alkanes is desired. The product consequently has a higher boiling range. The product is also to have the highest possible cetane number.

Butyl cyclohexane is preferably used as the initial hydrocarbon.

U.S. Pat. No. 5,334,792 and U.S. Pat. No. 5,831,139 describe a ring opening process for aromatic compounds and cycloaliphatic compounds as well as an isomerisation process for aliphatic compounds. The fraction used for this process comprises $C_6$-cycloparaffins or benzene. The process is performed in at least two reactors which are connected one behind the other. A zeolite catalyst which is operated under reaction conditions which result in a ring opening is contained in the first reactor. The following reactor is operated under reaction conditions which bring about an isomerisation of the aliphatic compounds. A bifunctional zeolite catalyst with metal constituents of 0.01 to 20% by weight is used as a catalyst for the first reaction zone (ring opening reaction). Zeolites having a constraint index of 12 or less are used as the zeolites. This catalyst is used for the ring opening, is preferably a zeolite of the beta or Y type with corresponding metal proportions of platinum. An aluminium oxide containing platinum is used as a catalyst for the second reaction stage, the isomerisation.

The purpose of the process is the reduction of aromatic compounds in fuels and in particular the manufacture of a high-octane paraffin petrol from the aromatic compounds by ring opening with bifunctional zeolite catalysts with subsequent isomerisation. The manufacture of isoalkanes is preferred. A reduction of the carbon number also does not take place.

The processes of the prior art convert the aromatic or cycloaliphatic compounds generally either into isoalkanes or higher $C_5$–$C_8$ alkanes are produced, in which case in both conversions the number of carbon atoms is changed hardly at all or is only slightly reduced in comparison with the initial compounds.

The technical object to the process according to the invention is therefore to make available a process for processing mineral oil fractions rich in aromatic compounds, in which the cyclic alkanes obtained after the hydrogenation of the aromatic compounds are converted to n-alkanes of a chain length which as far as possible is less than that of the charged carbons.

This technical object is achieved by means of a process for the manufacture of n-alkanes from mineral oil fractions and fractions from thermal or catalytic conversion plants containing cyclic alkanes, alkenes, cyclic alkenes and/or aromatic compounds, which is characterised by the following steps.

The mineral oil fraction is converted by a zeolite catalyst with a spaciousness index $SI \leq 20$ and a modified constraint index $CI^* > 1$. The hydrogen pressure during the reaction is 5 to 200 bar, preferably 40 to 80 bar and particularly preferably 50 to 70 bar and quite particularly preferably 60 bar. The reaction temperature is 150 to 550° C., preferably 300 to 500° C. and quite particularly preferably 400° C. The charging of the catalyst (WHSV) is 0.1 to 20 $h^{-1}$, preferably 0.5 to 3.0 $h^{-1}$ and particularly preferably 1.3 to 1.9 $h^{-1}$ and quite particularly preferably 1.66 $h^{-1}$. The cyclic hydrocarbons are converted by the process to n-alkanes, in particular ethane, propane and n-butane.

Compounds selected from the group consisting of substituted or non-substituted benzene, toluene, xylene, methyl cyclohexane are preferably used as cyclic alkanes or aromatic compounds.

In a preferred embodiment the percentage of the n-alkanes without methane and without $H_2$ in the reaction product is 50 to 95% by weight, preferably 66 to 90% by weight, and the percentage of cycloalkanes in the reaction product is $\leq 0.2\%$ by weight, whereby the content of aromatic compounds is not increased in comparison to the initial product.

The process according to the invention is characterised in that it converts aromatic compounds predominantly into n-alkanes having a lower carbon number than the initial substances. Thus n-alkanes, such as ethane, propane and n-butane, are predominantly produced. These compounds can be used in steam crackers and converted with high yields to the target products propylene and ethylene. Another advantage is that the propylene yield in the steam crackers is increased by the high quantity of propane. The process thus opens up the possibility of influencing the yield structures in steam crackers in a larger range than is possible according to the prior art.

The mineral oil fractions or fractions from conversion plants are normally hydrogenated in an upstream reaction stage. In another reaction stage these mineral oil fractions are then subjected to the process specified by the invention and the corresponding n-alkane compounds are produced.

It is basically also possible to perform the hydrogenation step and the process specified by the invention in a reactor. However, in this case it should be noted that the hydrogenation is generally performed at lower temperatures than the manufacture of the n-alkanes according to the process of the invention. Therefore performance in a reactor is possible when the temperature in the inlet region of the reactor is roughly 250° C. and in the outlet region at roughly 400° C. The catalyst charge in the reactor then has to be continuously changed from a known hydrogenation catalyst of the prior art to the catalyst for the process according to the invention. Such a temperature control and arrangement of the catalyst allows the utilisation of the hydrogenation heat produced during hydrogenation in order to heat the gas up to the temperature required for the n-paraffin formation. In the other case the hydrogenation heat that is produced had to be dissipated to avoid an overheating of the system and thus damage to the catalyst.

To avoid as far as possible the formation of by-products in the case of the conversion of the charging streams containing aromatic compounds, these are supplied in relatively cold condition for hydrogenation and only brought to hydrogenation temperature directly in front of the reaction zone. This preferably takes place by mixing in hot, already hydrogenated product in the hot circulation process. This procedure allows a very precise temperature control, produces short residence times at the temperature required for the hydrogenation and in addition results in a dilution effect of the constituents in the charging stream which have a tendency to form by-products. A heat exchanger or similar devices are not required for this.

The mineral oil fractions rich in aromatic compounds that are used for the hydrogenation contain roughly 80 to 95% by weight aromatic compounds and 1 to 20% by weight olefin compounds. During hydrogenation these are converted almost completely into cyclic aliphatic compounds.

With the process according to the invention it is possible to convert these fractions of up to 95% by weight containing cyclic alkanes into $C_2$–$C_4$ n-alkanes. In this case the formation of aromatic compounds, which occurs at higher temperatures, is avoided. The content of isoalkanes and cycloalkanes is also very low.

A zeolite catalyst is used as the catalyst for the process specified by the invention. This has a spaciousness index $SI \leq 20$ and a modified constraint index $CI^* > 1$. These index values are current parameters by which the zeolites can be characterised. In this respect reference is made to J. Weitkamp, S. Ernst and R. Kumar, Appl. Catal. 27 (1986), 207–210) and J. A. Martens, M. Tielen, P. A. Jacobs, J. Weitkamp, Zeolites 4 (1984, 98–107). The term "zeolite" is here defined in the widest sense as microporous material. It includes in particular not only zeolites with the chemical composition of aluminosilicates, but of any chemical composition, thus e.g. also aluminophoshpates (AlPO$_4$), silicoalumino phosphates (SAPO), gallosilicates etc. Whereas all zeolitic materials whose spaciousness index SI or modified constraint index CI* fall in the above-mentioned range are catalysts for the process according to the invention, zeolite ZSM-5 in its H form belongs to the preferred catalysts. This catalyst is described by way of example in U.S. Pat. No. 3,702,886.

The zeolite catalyst in the form according to the invention can be used directly in its H-form, i.e. without it having been modified with a metal having a hydrogenating action. Equally the invention contains zeolite catalysts which were charged with a hydrogenated active metal by means of any method. If the catalyst was modified with a metal having a hydrogenating action, the metal content moves between 0.0001 and 5% by weight, preferably between 0.001 and 2% by weight. The metals are preferably chosen from the group consisting of Pd, Rh, Ru, Ir, Os, Cu, Co, Ni, Pt, Fe, Zn, Ga, In, Mo, W, V.

A metal content of 0.01% by weight is completely preferably preferred.

Furthermore the use of a shape-selective zeolite catalyst is preferred. This means that the catalyst is chosen so that the zeolite pores and the size of the reactand molecules have the same order of magnitude. This results in a larger proportion of n-alkanes in comparison to the slightly awkwardly shaped isoalkanes in the product mixture. Moreover, the formation of precursors for the formation of aromatic compounds and coke, which results in catalyst deactivation, is prevented. Zeolites with faujasite structure, as are used to some extent in the prior art, deactivate very quickly and are characterised by CI*$\leq$1 and SI>20. The catalyst is preferably used in its H-form. In contrast to catalysts of the prior art, the catalyst thus has very acid centres, which as well as the ring opening enable an acid-catalysed cracking or hydrocracking to products with a lower carbon number than in the charged hydrocarbon. As a result the proportion of n-alkanes with lower carbon number in the product is greatly increased.

During the development of the process according to the invention it was ascertained that when using catalysts without metal content at relatively high temperatures aromatic compounds are formed. The optimal reaction temperature of these catalysts is therefore slightly lower than that of the catalysts with corresponding low metal content.

Another subject matter of the invention is a catalyst for the manufacture of n-alkanes from mineral oil fractions containing cycloalkanes and/or aromatic compounds. This catalyst consists of a zeolite with a spaciousness index of SI$\leq$20 and a modified constraint index CI*>1, the catalyst containing 0.0001 to 0.1% by weight, preferably 0.01% by weight of a metal selected from the group consisting of Pd, Rh, Ru, Ir, Os, Cu, Co, Ni, Pt, Fe, Zn, Ga, In, Mo, W, V or mixtures thereof. The catalyst is preferably a zeolite of the MFI structural type such as, for example, ZSM-5, described in U.S. Pat. No. 3,702,886. The catalyst preferably exists in its H-form.

The catalyst according to the invention can be distinguished from previously known zeolite catalysts by the fact that it only possesses very low metal contents. Normally catalysts are divided into monofunctional and bifunctional catalysts. Monofunctional catalysts contain as their catalytically active constituents only acid centres but no metal. Bifunctional catalysts are on the other hand characterised by the fact that they have both acid centres as well as a hydrogenated/dehydrogenated active constituent, typically 0.2 to 2% by weight of hydrogenated active precious metals.

In contrast to the monofunctional and bifunctional catalysts, the catalysts according to the invention are distinguished by the fact that they have these hydrogenated active metals only in traces of 0.0001 to 0.1% by weight. Therefore the properties of the catalysts are essentially determined by the acid centres, in which case, however, the metal content is however sufficient to hydrogenate to some extent aromatic compounds formed in the meantime at the acid centres or olefin compounds. As a result the catalyst deactivation is also reduced, which is a further advantage in the use of the catalysts according to the invention.

FIG. 1 shows the variations in the products obtained in dependence on the metal content with Pd/H-ZSM-5 catalysts. The reaction took place at 400° C., whereby the catalysts were activated at a temperature of 300° C. The charging (WHSV) was 0.71 h–1. Methyl cyclohexane was converted. From the results it can be seen that the catalyst without palladium (left-hand column) as a typical monofunctional catalyst results in a yield of n-alkanes, ethane, propane, n-butane and n-alkane with $n_c$>4 of 66.0%. Besides i-alkanes and methane, aromatic compounds and cycloalkanes were however also formed during the reaction.

The catalyst in the right-hand column with a metal content of 0.19% by weight palladium is a typical bifunctional catalyst. Here no aromatic compounds and cycloalkanes are produced during the reaction, but instead larger percentages of i-alkanes. The yield of the n-alkanes is 65.5%.

The middle column shows the results with a catalyst having a metal content of 0.01% by weight. During the reaction virtually no aromatic compounds and cycloalkanes are formed, and the yield of n-alkanes is considerably higher at 78.7% than the n-alkane yield with the monofunctional and bifunctional catalysts.

By purposeful coking, e.g. by methyl cyclohexane, toluol or 2-methyl naphthalene, it is possible to increase further the yield of n-alkanes with the catalyst.

The following Table 1 shows the composition of the mixture, in % by weight, that is obtained during the conversion of methyl cyclohexane with 0.01 Pd/H-ZSM-5 at 400° C. and WHSV of 0.71 and 1.66 h$^{-1}$.

From the table it can be seen that during the conversion of methyl cyclohexane to over 70% by weight n-alkanes such as ethane, propane and n-butane are produced.

TABLE 1

| WHSV/h-1 | 0.71 | 1.66 |
|---|---|---|
| methane | 3.68 | 2.74 |
| ethane | 11.38 | 10.87 |
| propane | 51.19 | 50.30 |
| n-butane | 15.03 | 14.23 |
| n-pentane | 1.03 | 1.37 |
| n-hexane | 0.03 | 0.04 |
| iso-butane | 13.82 | 13.84 |
| iso-pentane | 3.15 | 4.74 |
| iso-hexane | 0.23 | 0.45 |
| iso-heptane | 0.00 | 0.03 |
| cyclopentane | 0.06 | 0.13 |
| $C_6$-cycloalkane | 0.01 | 0.02 |
| $C_7$-cycloalkane | 0.11 | 0.03 |
| $C_8$-cycloalkane | 0.00 | 0.01 |
| benzene | 0.01 | 0.07 |
| toluene | 0.09 | 0.35 |

TABLE 1-continued

| | | |
|---|---|---|
| $C_8$ aromatic compounds | 0.12 | 0.55 |
| $C_9$ aromatic compounds | 0.05 | 0.24 |

In relation to the known bifunctional catalysts the manufacture of the catalyst according to the invention is considerably cheaper on account of the low precious metal content.

Another important factor for the quality of the catalyst is the shape selectivity. The following Table 2 shows the results of the conversion of methyl cyclohexane at 400° C. and 6 MPa with zeolite catalysts not containing precious metals and having varying pore geometry. Zeolite Y is a wide-pore zeolite with large pore diameter and large cavities. Awkwardly shaped isoalkanes and coke can easily be formed with its H-shape. The ratio of the yield of n-alkanes to the yield of isoalkanes is relatively unfavourable with this type of zeolite ($Y_{n-alk.}/Y_{i-alk.}$=1.1). Furthermore a strong deactivation is to be noted (conversion after ½ hour running time 100%, conversion after 8 hours running time only 75%).

TABLE 2

Conversion of methyl cyclohexane with zeolites of varying pore dimensions at 400° C. and 6 MPa

| zeolite | H-ZSM-22 | H-ZSM-5 | H-ZSM-12 | H-Y |
|---|---|---|---|---|
| pore system (pore diameter/nm) | 1-d 10-R (0.55 × 0.44) | 2-d 10-R. (0.56 × 0.53) and 0.55 × 0.51) | 1-d 12-R. (0.59 × 0.55) | 3-d 12-R (0.74) super cage: d = 1.3 nm |
| $n_{si}/n_{Al}$ | 39 | 19 | 58 | 2.5 |
| WHSV/h$^{-1}$ | 0.71 | 0.73 | 0.71 | 0.92 |
| $X_{1/2\,h}^1$/% | 23.3 | 100 | 99.6 | 100 |
| $X_{8\,h}/X_{1/2\,h}^2$/% | 100 | 100 | 99.7 | 74.7 |
| $Y_{methane}^3$/% | 0.9 | 4.3 | 1.1 | 0.5 |
| $Y_{n-alk.}^{3,4}$/% | 15.9 | 70.7 | 53.9 | 47.3 |
| $Y_{iso-alkane}^3$/% | 5.3 | 22.0 | 39.6 | 43.8 |
| $Y_{cycloalk.}^3$/% | 1.1 | 0.1 | 1.7 | 1.3 |
| $Y_{aromatic\,comp.}^3$/% | 0.0 | 2.9 | 3.2 | 7.1 |
| $Y_{n-bu}^3/Y_{i-bu}^3$ | 1.01 | 0.70 | 0.54 | 0.39 |
| $Y_{n-alk.}^{3,4}/Y_{i-alk.}^3$ | 3.00 | 3.21 | 1.36 | 1.08 |
| $\dfrac{Y_{Et}^3 + Y_{pr}^3}{Y_{C4+-Kw.}^3}$ | 1.03 | 1.61 | 0.61 | 0.47 |

[1]Conversion of methyl cyclohexane after ½ hour running time
[2]Ratio of the conversion after 8 hr running time to the conversion after ½ hr running time
[3]Yield after 30 min running time
[4]without methane The zeolite ZSM-22 is a medium-pore zeolite with an only one-dimensional pore system. Therefore a high proportion of n-alkanes is formed with its H-shape ($Y_{n-alk.}/Y_{i-alk.}$=3.0). Of course the pore system is so narrow that the educt methyl cyclohexane scarcely gains access, i.e. pore diffusion is obstructed. For this reason the conversion during the reaction is only 23%. The three-dimensional pore system of the medium-pore zeolite ZSM ideally lies between the pore systems of the zeolites ZSM-22 and Y. Methyl cyclohexane can easily diffuse into the zeolite so that a conversion of 100% is observed. However the pores are sufficiently narrow so that the formation of awkwardly shaped isoalkanes and of coke is affected very unfavourably, which is expressed by the fact that the conversion in the considered time period of 8 hours running time remains constant at 100% and the ratio of the yields of n-alkanes to i-alkanes is 3.2.

The zeolite ZSM-12 in fact has slightly larger pore openings than zeolite ZSM-5, but they are clearly smaller than those of zeolite Y; in addition the pore system of ZSM-12 is one-dimensional and does not have large cages, like that of zeolite Y, for which reason with H-ZSM-12 the ratio of the yield of n-alkanes to the yield of isoalkanes is 1.4, i.e. substantially smaller than with ZSM-5. Nevertheless in comparison with the pore system of zeolite Y the pore system is sufficiently narrow to prevent a rapid reduction of the conversion by coke formation in the time period under consideration.

The zeolite ZSM-5 serves not only as an example for an ideal zeolite in the context of the invention. Depending on experimental conditions, every zeolite whose pore system offers less space than that of zeolite Y, i.e. for SI≦20 and CI*>1, can be used, provided the initial substances still gain access to the pore system of this zeolite.

Figure 2:
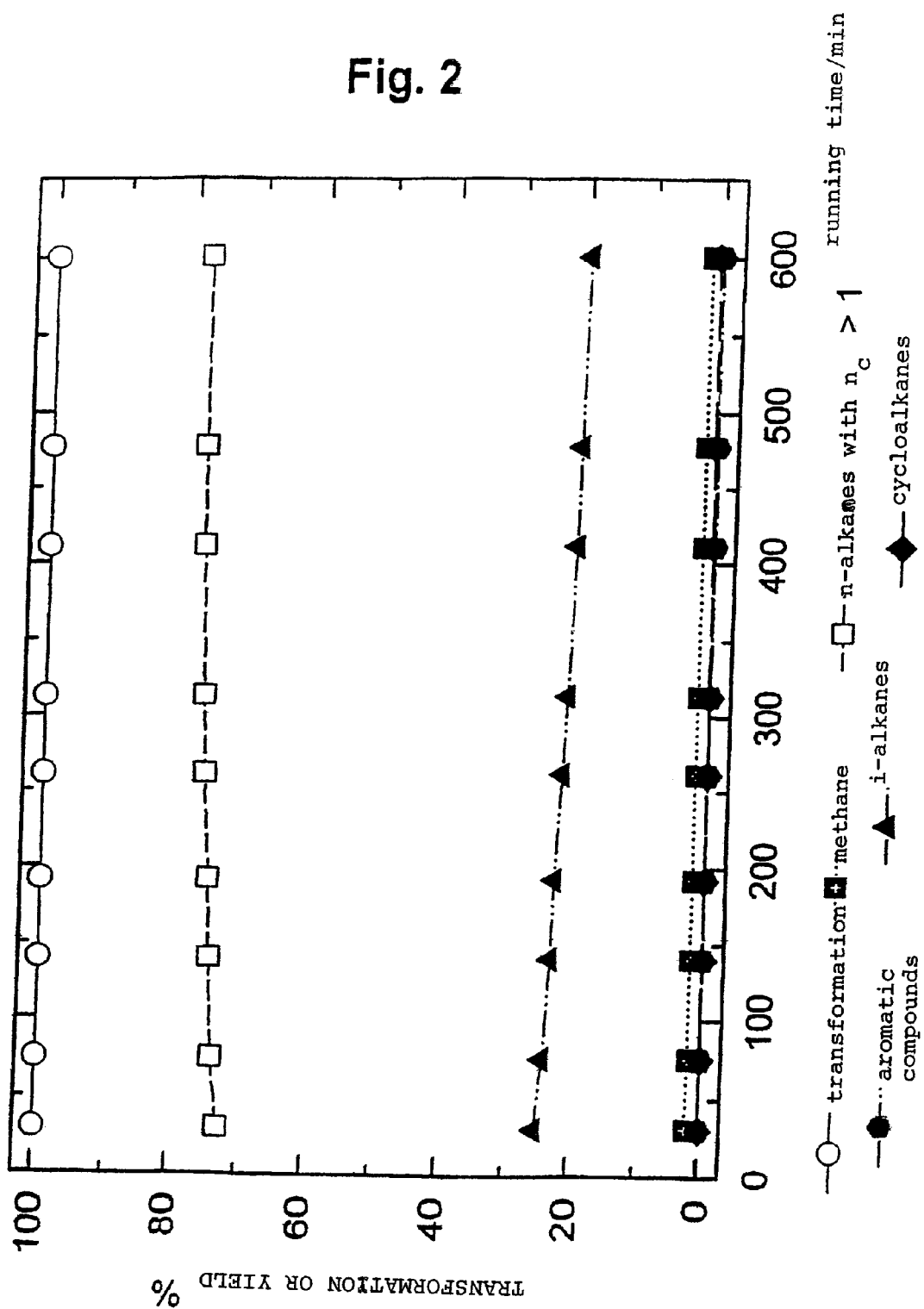

As has already been mentioned above, the process according to the invention may also be performed in one stage. Firstly the hydrogenation of the charging mixture rich in aromatic compounds to cyclic alkanes occurs and then the transformation of these cycloalkanes to n-alkanes with the same catalyst. In this process it is also possible to use the catalyst according to the invention when the metal content of the catalyst is at least 0.01% by weight. The preferred metal is palladium. The following FIG. 2 shows the transformation of toluene with H-ZSM-5 having a palladium content of 0.19% by weight at 400° C. and a concentration (WHSW) of 1.59 h-1. From this figure it can be seen that during the transformation of toluene the proportion of the obtained n-alkanes in the product stream is already 72.9% by weight after a running time of 30 minutes. 24.9% by weight i-alkanes and 2.3% by weight methane are obtained. As the running time increases, the proportion of n-alkanes without methane increases on account of a moderate coking of the catalyst. In this case the pores of the catalyst are narrowed. The proportion of n-alkanes rises after a running time of 600 minutes to 77.9% by weight, the proportion of i-alkanes and of the methane in the product stream being reduced to 19.7 and 1.8% by weight respectively. The content of cycloalkanes and aromatic compounds is together 0.7% by weight.

The following Table 3 shows the composition of the [1]) during the conversion of toluene with 0.01 Pd/H-ZSM-5, which was activated at 300° C., or 0.19 Pd/H-ZSM-5, which was activated at 400° C., with a reaction temperature of 400° C. and a WHSV of 0.7 h$^{-1}$. The table shows that with slightly higher metal contents an extensive transformation of the toluene to ethane, propane and n-butane takes place, whereby the content of aromatic compounds is more or less 0% by weight.

TABLE 3

| Pd content/% by weight | 0.01 | 0.19 |
|---|---|---|
| methane | 0.38 | 2.99 |
| ethane | 1.50 | 6.51 |
| propane | 4.96 | 47.54 |
| n-butane | 0.99 | 16.46 |
| n-pentane | 0.05 | 0.32 |
| iso-butane | 1.29 | 25.62 |
| iso-pentane | 0.18 | 0.55 |
| iso-hexane | 0.03 | 0.00 |
| cycloalkane | 0.41 | 0.00 |
| benzene | 11.39 | 0.00 |
| toluene | 61.13 | 0.00 |
| $C_8$ aromatic compounds | 16.06 | 0.00 |
| $C_9$ aromatic compounds | 1.60 | 0.00 |
| $C_{10}$ aromatic compounds | 0.03 | 0.00 |

Since with respect to lightly coked catalysts higher yields of n-alkanes without methane can be achieved with at the same time clearly smaller yields of methane, the process according to the invention includes, both for the conversion of aromatic compounds as well as for the conversion of cycloalkanes, the use of previously coked catalysts, e.g. by methyl cyclohexane, toluol or 2-methylnaphthalene.

Streams rich in aromatic compounds can be supplied for a new application with the process according to the invention. After hydrogenation and ring opening of the fractions rich in aromatic compounds, saturated liquid gases remain, which are eminently suited for the production of ethylene and propylene. By this a stream of substances which in future is unsuited as motor fuel constituents is revalorised by the charge in the steam cracker, the quantity of the normal steam cracker charge is reduced and the incidence of pyrolysis heavy petrol is avoided or at least reduced.

The fact that the petrol fractions rich in aromatic compounds can be supplied for new economic uses by their being processed as high-grade constituents for the production of olefins proves to be a further advantage of the process according to the invention.

The invention claimed is:

1. A process for the manufacture of a reaction product comprising one or more n-alkanes from an initial product comprising one or more mineral oil fractions comprising 80 to 95% by weight aromatic compounds and 1 to 20% by weight olefin compounds or pyrolysis gasoline, said process comprising:
    converting one or more cyclic hydrocarbons with a zeolite catalyst having a spaciousness index $SI \leq 20$ and a modified constraint index $CI^* > 1$, where the one or more cyclic hydrocarbons include hydrocarbons produced by hydrogenation of the one or more mineral oil fractions,
    wherein during the converting
        the $H_2$ pressure is 5 to 200 bar,
        the temperature is 150 to 550° C.,
        the concentration (WHSV) is 0.1 to 20 $h^{-1}$, and
        the one or more cyclic hydrocarbons are converted to n-alkanes.

2. The process according to claim 1, wherein
    the proportion of n-alkanes without methane and without $H_2$ in the reaction product is 50 to 95% by weight,
    the proportion of cycloalkanes in the reaction product is $\leq 0.2\%$ by weight, and
    the content of aromatic compounds in the reaction product in comparison to the initial product is not increased.

3. The process of claim 2, wherein the proportion on n-alkanes without methane and without $H_2$ in the reaction product is from 66 to 90% by weight.

4. The process according to claim 1, wherein the n-alkanes are selected from the group consisting of ethane, propane, and n-butane.

5. The process according to claim 1, wherein the zeolite catalyst is ZSM-5 in H-form.

6. The process according to claim 1, wherein the $H_2$ pressure is 40 to 80 bar.

7. The process of claim 6, wherein the $H_2$ pressure is 50 to 70 bar.

8. The process according to claim 1, wherein the temperature is 300 to 500° C.

9. The process according to claim 1, wherein the concentration (WHSV) is 0.5 to 3.0 $h^{-1}$.

10. The process of claim 9, wherein the concentration (WHSV) is 1.3 to 1.9 $h^{-1}$.

11. The process according to claim 1, wherein the zeolite catalyst comprises from 0.0001 to 5% by weight of a hydrogenation active metal selected from the group consisting of Pd, Rh, Ru, Ir, Os, Cu, Co, Ni, Pt, Fe, Zn, Ga, In, Mo, W, V and mixtures thereof.

12. The process according to claim 1, wherein the zeolite catalyst is shape-selective and has zeolite pores the same size as a reactant.

13. The process according to claim 1, further comprising hydrogenating the one or more mineral oil fractions in an upstream reaction stage.

14. The process according to claim 13, wherein the hydrogenation and the manufacture of the n-alkanes take place in a reactor, a hydrogenation catalyst is charged first and then the zeolite catalyst is passed through, and wherein the temperature of the reactor is raised from 250° C. at an inlet to 400° C. at an outlet.

15. The process according to claim 13, wherein the hydrogenation and the manufacture of the n-alkanes takes place with a catalyst on a zeolite base having a spaciousness index $SI \leq 20$ and a modified constraint index $CI^* > 1$ and a metal content of hydrogenation active metal of more than 0.01% by weight, wherein the hydrogenation active metal is selected from the group consisting of Pd, Rh, Ru, Ir, Os, Cu, Co, Ni, Pt, Fe, Zn, Ga, In, Mo, W, V and mixtures thereof.

16. The process according to claim 13, wherein a heat of reaction produced during the hydrogenating is used for heating during the manufacture of the n-alkanes.

17. The process of claim 1, wherein the pyrolysis gasoline is a heavy gasoline.

18. A process comprising
    treating one or more mineral oil fractions comprising from 80 to 95% by weight of one or more aromatic compounds and 1 to 20% by weight of one or more olefin compounds or pyrolysis gasoline, with a catalyst to form one or more n-alkanes,
    wherein said catalyst comprises a zeolite having a spaciousness index $SI \leq 20$ and a modified constraint index $CI^* > 1$, wherein the catalyst comprises from 0.0001 to 0.1% by weight of a metal selected from the group consisting of Pd, Rh, Ru, Ir, Os, Cu, Co, Ni, Pt, Fe, In, Mo, W, V and mixtures thereof.

19. The process of claim 18, wherein the zeolite has a structure type MFI (ZSM-5).

20. The process of claim 18, wherein the catalyst is present in an H-form.

21. The process of claim 18, wherein the catalyst is coked to increase the yield of the n-alkanes.

* * * * *